(12) United States Patent
Dellinger et al.

(10) Patent No.: US 10,139,512 B2
(45) Date of Patent: Nov. 27, 2018

(54) OPERATIONAL CONTROL IN A SEISMIC SOURCE

(71) Applicants: Joseph Anthony Dellinger, Houston, TX (US); Mark Francis Lucien Harper, Cambridge (GB)

(72) Inventors: Joseph Anthony Dellinger, Houston, TX (US); Mark Francis Lucien Harper, Cambridge (GB)

(73) Assignee: BP Corporation North America Inc., Houston, TX (US)

( * ) Notice: Subject to any disclaimer, the term of this patent is extended or adjusted under 35 U.S.C. 154(b) by 675 days.

(21) Appl. No.: 14/602,050

(22) Filed: Jan. 21, 2015

(65) Prior Publication Data
US 2015/0204992 A1    Jul. 23, 2015

Related U.S. Application Data

(60) Provisional application No. 61/929,656, filed on Jan. 21, 2014.

(51) Int. Cl.
*G01V 1/38* (2006.01)
*G01V 1/04* (2006.01)
*G01V 1/145* (2006.01)

(52) U.S. Cl.
CPC .............. *G01V 1/3861* (2013.01); *G01V 1/04* (2013.01); *G01V 1/145* (2013.01); *G01V 2210/1293* (2013.01)

(58) Field of Classification Search
CPC ........ G01V 1/145; G01V 1/04; G01V 1/3861; G01V 2210/1293
See application file for complete search history.

(56) References Cited

U.S. PATENT DOCUMENTS 4,049,077 A * 9/1977 Mifsud .................... G01V 1/04
                                                            181/114
4,056,163 A * 11/1977 Wood ...................... G01V 1/04
                                                            181/113

(Continued)

FOREIGN PATENT DOCUMENTS

CN          103323876        9/2013
EP           2267486        12/2010
                (Continued)

OTHER PUBLICATIONS

PCT International Search Report dated Mar. 7, 2016.
(Continued)

*Primary Examiner* — Krystine E Breier
(74) *Attorney, Agent, or Firm* — Robert Hsiao

(57) ABSTRACT

A method for controlling trajectory in a resonant marine seismic source comprises: controlling the source frequency and controlling the motion trajectory. Controlling the source frequency includes: estimating the source frequency from its internal state and the state of its environment; deriving a frequency error as the difference between the estimated frequency and the frequency of the desired trajectory; and driving the frequency error to zero. Controlling the motion trajectory includes: detecting a motion trajectory of the source; deriving a motion trajectory error as the difference between the desired motion trajectory and detected motion trajectory; and driving the motion trajectory error to zero.

7 Claims, 7 Drawing Sheets

(56) References Cited

U.S. PATENT DOCUMENTS

| | | | |
|---|---|---|---|
| 4,319,347 A | 3/1982 | Savit | |
| 4,670,863 A * | 6/1987 | Sallas | G01V 1/04 181/121 |
| 4,758,998 A | 7/1988 | Johnson et al. | |
| 4,782,446 A * | 11/1988 | Ehler | G01V 1/04 367/190 |
| 5,241,285 A * | 8/1993 | Jackson | H03L 7/093 331/1 A |
| 5,430,689 A | 7/1995 | Rigsby et al. | |
| 7,257,049 B1 | 8/2007 | Laws et al. | |
| 7,725,266 B2 | 5/2010 | Sirgue et al. | |
| 7,823,689 B2 * | 11/2010 | Aronstam | G01V 1/42 181/101 |
| 8,792,300 B2 * | 7/2014 | Sallas | G01V 1/005 118/113 |
| 8,902,698 B2 | 12/2014 | Hegna et al. | |
| 8,907,506 B2 | 12/2014 | Marin | |
| 8,950,263 B2 | 2/2015 | Giordano et al. | |
| 2003/0218937 A1 | 11/2003 | Berg et al. | |
| 2007/0133354 A1 | 6/2007 | Bagaini et al. | |
| 2007/0195644 A1 | 8/2007 | Marples et al. | |
| 2008/0253226 A1 | 10/2008 | Tenghamn et al. | |
| 2009/0122319 A1 * | 5/2009 | Ronnekleiv | G01H 9/004 356/477 |
| 2009/0147621 A1 | 6/2009 | Hegna | |
| 2010/0002539 A1 | 1/2010 | Kragh et al. | |
| 2010/0232260 A1 | 9/2010 | Zowarka et al. | |
| 2010/0322028 A1 * | 12/2010 | Tenghamn | G01V 1/159 367/21 |
| 2011/0085416 A1 | 4/2011 | Sallas | |
| 2011/0162906 A1 | 7/2011 | Harper et al. | |
| 2012/0063263 A1 | 3/2012 | Kamata et al. | |
| 2012/0075955 A1 | 3/2012 | Dean | |
| 2012/0147699 A1 | 6/2012 | Dellinger et al. | |
| 2012/0155217 A1 | 6/2012 | Dellinger et al. | |
| 2012/0314536 A1 | 12/2012 | Bagaini | |
| 2013/0013212 A1 | 1/2013 | Hatchell et al. | |
| 2013/0021875 A1 | 1/2013 | Eick et al. | |
| 2013/0100766 A1 | 4/2013 | Teyssandier et al. | |
| 2013/0155810 A1 | 6/2013 | Dowle et al. | |
| 2013/0170317 A1 | 7/2013 | Stork | |
| 2013/0193693 A1 | 8/2013 | Marin et al. | |
| 2013/0201789 A1 | 8/2013 | Phillips et al. | |
| 2013/0250733 A1 | 9/2013 | Phillips et al. | |
| 2013/0264141 A1 | 10/2013 | Wei et al. | |
| 2013/0308422 A1 | 11/2013 | Eick et al. | |
| 2013/0333974 A1 | 12/2013 | Coste et al. | |
| 2014/0043937 A1 | 2/2014 | Teyssandier et al. | |
| 2014/0081576 A1 | 3/2014 | Grenie et al. | |
| 2014/0104986 A1 | 4/2014 | Teyssandier et al. | |
| 2014/0112097 A1 | 4/2014 | Dowle et al. | |
| 2014/0226439 A1 | 8/2014 | Tenghamn | |
| 2014/0254312 A1 | 9/2014 | Dowle et al. | |
| 2014/0254313 A1 | 9/2014 | Dowle et al. | |
| 2014/0336939 A1 | 11/2014 | Brune | |
| 2015/0120200 A1 | 4/2015 | Brenders et al. | |
| 2015/0301205 A1 * | 10/2015 | Harper | G01V 1/005 367/16 |
| 2016/0124097 A1 * | 5/2016 | Laro | G01V 1/04 367/190 |

FOREIGN PATENT DOCUMENTS

| | | |
|---|---|---|
| GB | 2495801 | 4/2013 |
| WO | 2010149589 | 12/2010 |
| WO | 2014076076 | 5/2014 |

OTHER PUBLICATIONS

PCT International Search Report dated Mar. 14, 2016.
PCT International Search Report dated Mar. 9, 2016.
PCT International Search Report dated Mar. 2, 2016.
PCT International Search Report dated Apr. 4, 2016.
PCT Search Report dated Feb. 24, 2015.

* cited by examiner

OPERATIONAL CONTROL IN A SEISMIC SOURCE

The priority of U.S. Application Ser. No. 61/929,656, entitled "Operational Control in a Seismic Source", and filed Jan. 21, 2014, in the name of the inventors Mark Francis Lucien Harper and Joseph Anthony Dellinger, is hereby claimed pursuant to 35 U.S.C. § 119(e). This application is also hereby incorporated by reference for all purposes.

FIELD OF THE INVENTION

The present invention pertains to marine seismic sources and, in particular, a control strategy for a resonant controlled-frequency seismic source employing a mechanical oscillator.

BACKGROUND OF THE INVENTION

Seismic surveying is the practice of studying subterranean formations from reflections by those formations of acoustic waves. This includes imparting acoustic waves into a natural environment so that they may enter the earth and travel through the subterranean geological formations of interest. During their travels through the formations, certain features of the formations will reflect the waves back to the surface where they are recorded. The recorded reflections are then studied to ascertain information about those formations.

One type of seismic survey is the "marine" seismic survey. The term "marine" only indicates that the survey occurs in or on the water. It does not necessarily imply that the survey is occurring in a saltwater environment. While a marine seismic survey may occur in a saltwater environment, such as the ocean, it may also occur in brackish waters such as are found in bays, estuaries, and tidal swamps. They may even be conducted in wholly freshwaters such as are found in lakes, marshes, and bogs.

There are many kinds of seismic sources whose designs are typically, to some degree, tailored to the environment in which they are intended for use. Marine seismic surveys are frequently performed using what is called a "swept" source. The term "swept" comes from the operation of such sources, in which they "sweep" through a band of frequencies during the transmission of the seismic signal.

One recent development in marine seismic surveying is the acquisition of "humming" data, i.e. data from a signal generated from a "humming" source. "Humming" is using a non-impulsive controlled-frequency source that generates substantially all of its energy at a single frequency. Due to practical stability limitations the source may instead perform a controlled or uncontrolled drift within a narrow frequency range, typically staying within plus or minus one tenth of an octave around the nominal frequency. This is sometimes called "monochromatic" or "near monochromatic", for example in U.S. application Ser. No. 13/327,524.

Humming acquisition may occur in several different ways. For example, stepped humming is a sequential humming acquisition in which a single source steps over a set of two or more discrete frequencies, one at a time. The time spent moving between frequencies should be very small compared to the time spent at each frequency. Another example, chord humming, is acquisition in which one or more sources simultaneously hum at differing, discrete frequencies. More information is available in U.S. application Ser. No. 13/327,524.

Another relatively recent development in seismic acquisition is "low frequency" acquisition. Seismic surveying historically has used frequencies in the range of 10-250 Hz for seismic signals because of their suitability in light of technical challenges inherent in seismic surveying. The term "low frequencies" is understood within this historical context, as frequencies below which getting sufficient signal to noise with conventional sources rapidly becomes more difficult as the frequency decreases (i.e. below about 6-8 Hz).

One example of a low frequency source that can sweep, or hum, or both sweep and hum, at low frequency is disclosed and claimed in U.S. patent application Ser. No. 12/995,763, filed Jun. 17, 2009. This particular source consists of a tunable mechanical resonator, which together with its control system, comprises a self-excited oscillator. The control system therein detects the velocity of the radiating piston and applies a drive force in the same direction as the detected velocity, causing the system to oscillate at or near its natural frequency. That frequency is controlled by varying the stiffness of a gas spring, so that the system can be caused either to oscillate at a single chosen frequency (i.e. "hum") or over a continuous band of frequencies at some chosen rate (i.e. "sweep"). More information is available in U.S. application Ser. No. 12/995,763.

However, one issue with low frequency sources is that the frequency introduces problems that typical, conventional seismic frequencies do not. One way to address these problems is through accurate and precise control of the source's operation. For example, one type of control is known as frequency stability control, in which the operation of the source is controlled to help stabilize the frequency at which it emits the seismic signals.

Seismic sources, such as those presented in the aforementioned applications, are suitable for their intended purpose. However, the art is always receptive to improvements or alternative approaches, methods and configurations. The art will therefore well receive the seismic source described herein.

BRIEF DESCRIPTION OF THE DRAWINGS

The accompanying drawings, which are incorporated in and constitute a part of this specification, illustrate embodiments of the invention and together with the description, serve to explain the principles of the invention. In the figures:

FIG. 2 is used.

DESCRIPTION OF THE EMBODIMENTS

Figure 1:
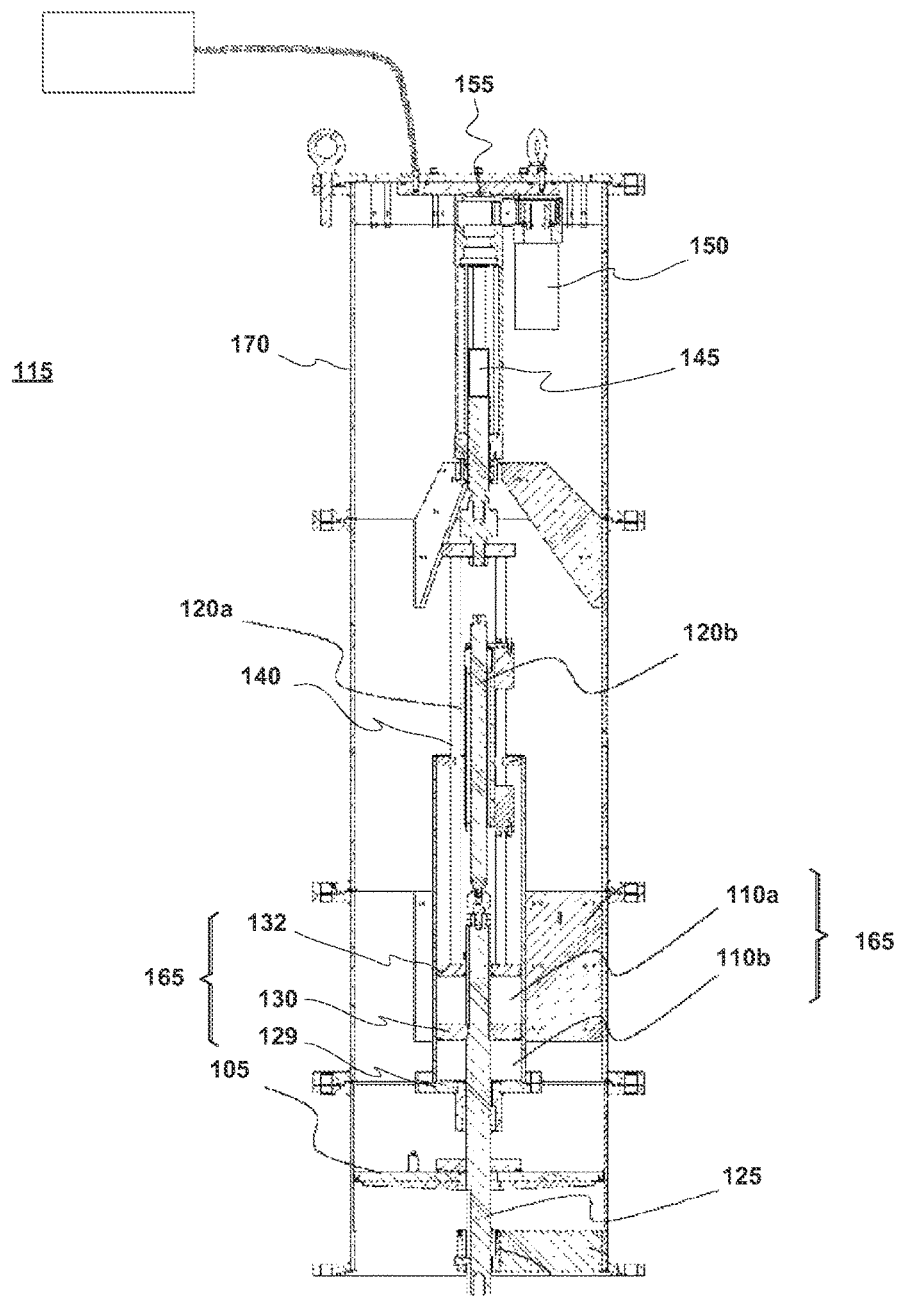
FIG. 1 depicts a resonant marine seismic source with which the presently disclosed control technique may be employed.

Reference will now be made in detail to the present embodiment(s) (exemplary embodiments) of the invention, an example(s) of which is (are) illustrated in the accompanying drawings. Wherever possible, the same reference numbers will be used throughout the drawings to refer to the same or like parts.

The presently disclosed trajectory control technique is a control strategy for a resonant controlled-frequency marine seismic source employing a mechanical resonator. Because the marine seismic source is "resonant", it will tend to naturally oscillate at its resonant frequency. The marine seismic source includes an excitation actuator that injects energy into this oscillation to help overcome, for example, friction and radiation losses. It also includes an actuator, or actuators, that control the frequency of its resonance, hereinafter referred to as the frequency control technique. However, the amplitude and frequency of the acoustic output of the marine seismic source may vary in an unintended manner owing both to changes in the environment such as hydrostatic pressure and to changes in the internal state of the source such as its internal temperature. This unintended variation can be detrimental to certain types of seismic surveys.

Accordingly, the presently disclosed trajectory control technique applies trajectory control to keep the amplitude and frequency of the acoustic output of the marine seismic source very close to their target values. In this context, "trajectory control" controls the motion of a mechanical oscillator to cause it to follow a desired trajectory over time. "Trajectory" here means the precise motion of the moving part or parts of the oscillator. "Motion" may be taken to refer to the position, or velocity, or acceleration of the parts according to which it is most convenient to detect and control under a number of conditions.

These conditions may vary by implementation and therefore will be implementation specific. For example, the controlled motion should be susceptible to detection and control despite unanticipated, time-varying, disturbing environmental influences which may affect both the amplitude and frequency of the oscillator. Or, the motion should be susceptible to detection and control where the amplitude and frequency that characterize the desired trajectory may both vary with time; or where the available techniques of controlling the oscillator consist of a mechanism for varying its frequency and a separate exciter force applied directly to the moving parts(s) for exciting its motion; or where the exciter force is small compared to the alternating forces typically at play in the oscillator, the exciter can influence, but not wholly determine, the motion of the oscillator. Still other conditions may become apparent to those skilled in the art having the benefit of this disclosure.

The trajectory control method comprises two feedback loops. The first feedback loop estimates the oscillator's natural frequency, derives a frequency error as the difference between the estimated frequency and the frequency of the desired trajectory, and utilizes the frequency control mechanism to attempt to drive the error signal to zero in the manner well known to those versed in the art of control engineering.

The second feedback loop detects the motion trajectory of the oscillator, derives an error signal from the difference between the desired and detected trajectories, and applies a control force via the exciter that attempts to drive the error signal to zero in the manner well known to those versed in the art of control engineering.

Returning to the oscillation of the marine seismic source, it may be either non-linear or linear. If the oscillation is non-linear, and the desired trajectory is that of a linear oscillator, the control technique may have the effect of linearizing the behaviour of the oscillation. In the illustrated embodiments it is also a high-Q resonator, which is a resonator where a minimal amount of introduced energy is required to sustain the oscillation (e.g., the resistive impedance in the resonator, due to friction, viscosity, etc., is much less than the impedance of the spring stiffness at the resonance frequency).

One suitable marine seismic source, with which the presently disclosed control technique may be used, is disclosed and claimed in U.S. Ser. No. 12/995,763. To further illustrate and promote an understanding of the presently disclosed trajectory control technique, this disclosure will now discuss its application to this particular marine seismic source. A full disclosure regarding its construction and operation may be found in U.S. Ser. No. 12/995,763, and portions will be reproduced herein; modified to reflect the implementation of the present trajectory control technique as well as a frequency stabilization control.

Turning now to FIG. 1, the marine seismic source 100 is a resonant, low frequency, high-Q source. This particular source may be used in either swept or humming acquisition. It includes a radiating piston 105 of the order of a few meters across backed by variable gas spring 165 containing gas spring spaces 110a, 110b each containing a fixed mass of gas. The resonant frequency of the source is controlled by the ratio of the mass of the moving assembly 105, 125, 130, 120b (including the mass of fluid 115, typically seawater, entrained in the motion of the piston 105) to the combined stiffness of the variable gas spring 165 and the gas contained within the casing 170. The gas pressure in the spring is kept at levels for which the natural frequency of the piston 105 loaded by the fluid 115 lies in the seismic band and may be as low as 0.5 Hz.

The piston 105 is given an initial displacement and begins to oscillate. Its oscillations are sustained by an actuator 240 (shown in FIG. 2), comprised of an electric linear motor coil 120a, a magnetic rod 120b, and a position sensor 255 (also shown in FIG. 2). The drive signal of the actuator 240 is derived from the velocity of the piston 125 via a velocity or displacement sensor in accordance with the present control technique. The marine seismic source 100 sweeps its frequency by gradually compressing the gas in the gas spring spaces 110a, 110b so that the variable gas spring 165 becomes stiffer. The stiffness increases both because of the rising pressure and because of the reducing length of the gas spring spaces 110a, 110b. This double effect allows large changes in stiffness to be produced and hence allows the marine seismic source 100 to operate over at least three octaves of frequency.

More particularly, the marine seismic source 100 in FIG. 1 is immersed in the water 115. A radiating piston 105, of the order of a few meters in diameter, is fixed to a shaft 125 that is free to move vertically. Behind the radiating piston 105 a secondary piston 130 is also fixed to the shaft 125 and divides the gas within the gas spring cylinder 133 into two volumes 110a, 110b. The upper end of the space 110a is closed by a tertiary piston 132 attached to a yoke 140.

The yoke 140 is in turn attached to a linear actuator 145, which presents a very high mechanical impedance compared to the mechanical impedance of the gas spring 110a, 110b. The actuator 145 incorporates a position sensor (not shown) which allows a control system to measure the position of the actuator 145 at any time and to stiffen its motion using active feedback in a manner well known to those versed in the art of industrial control systems. The position of the tertiary piston 132 will be controlled by the actuator 145 and, because of the active stiffening, will not be affected by changes of pressure in the gas spring volume 110a resulting from oscillations of the radiating piston 105.

The actuator 145 is driven by an electric motor 150 via a drive band 155. Within the yoke 140 and supported from it is an electric linear motor coil 120a. A magnet rod 120b is guided through the coil 120a by plain bearings (not shown) and is attached to the upper end of the shaft 125. An electric linear motor may be used because it has low mechanical impedance and so does not limit or impede the motion of the moving assembly 105, 125, 130, 120b. The linear motor incorporates a position sensor (not shown) which allows a control system to measure the relative position of the actuator rod 120b and coil 120a, at any time, in a manner well known to those versed in the art of industrial control systems.

Figure 2:
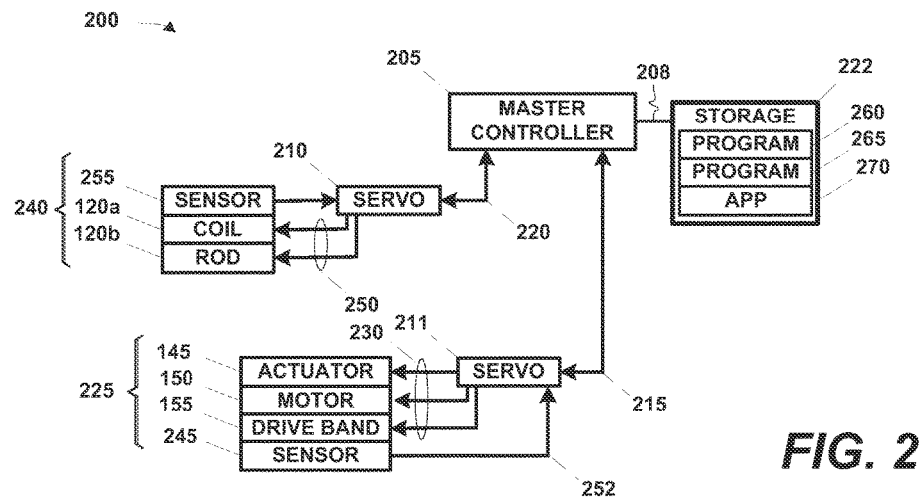
FIG. 2 illustrates one particular control system, by which the marine seismic source of FIG. 1 may be controlled in accordance with the presently disclosed trajectory control technique.

FIG. 2 illustrates one particular control system 200 by which the marine seismic source of FIG. 1 may be controlled in accordance with the presently disclosed trajectory control technique. A master controller 205 communicates with two single-axis servo-controllers 211, 210 via serial communications links 215, 220. It also communicates with storage 222 over a communications link 208 as described below.

The servo-controller 211 controls the high impedance actuator 225 comprised of the actuator 145, motor 150, and drive band 155, via motor drive lines 230. The extension of the actuator 145 is fed back from an internal sensor 245 (for example a shaft encoder on its motor 150) to the servo-controller 211 via feedback cable 252. Likewise the servo-controller 210 controls the low impedance actuator 240, partially comprised of the coil 120a and the rod 120b, via motor drive lines 250. The position of the radiating piston 105 is fed back from a position sensor 255 attached to the radiating piston 105, which may, for example, be a linear variable differential transformer to the servo-controller 210.

The master controller 205 is used to download control programs 260, 265 to the servo-controllers 211, 210. The program 260 downloaded to the servo-controller 211, when initiated, may cause the high-impedance actuator 225 to execute a desired extension which may for example consist of an initial short high-acceleration phase, a phase of extension at constant velocity, a subsequent short deceleration phase in which the actuator 225 is brought to rest, a delay which may, for example, be ten seconds long, and a return-to-start phase in which the actuator extension is returned to its initial value and the program terminates execution. The total time interval between initiation and return to the initial extension value may be fixed and may be denoted by T.

The program 265 downloaded to the servo-controller 210, when initiated, may cause the low-impedance actuator 240 to deliver an initial impulsive force to the piston rod 125 and may thereafter monitor the motion of the radiating piston 105 via the sensor 255 and cause the actuator 240 to apply a fixed level of force in the direction of the motion thereby effecting bang-bang control in a manner well known to those versed in the art of control system design. The force may then be reduced to zero and the program 265 may terminate after a time interval after initiation also equal to T.

In normal operation the master controller 205 may cause the programs 260, 265 downloaded to the controllers 211, 210 to begin execution simultaneously. The combined effect will then be to cause the system to execute a frequency sweep as hereinbefore described.

The control technique disclosed herein is also implemented by the master controller 205 in accordance with the application 270 residing on the storage 222. In addition to sending control signals to the high impedance actuator 225 and the low impedance actuator 240, it also receives feedback from them over the links 215, 220. The master controller 205 acts upon this feedback and in accordance with the program in the application 270 controls the piston trajectory as described further below.

The control system 200 is located on or in the seismic source 100 of FIG. 1 in the illustrated embodiment. However, this is not required for the practice of the control technique disclosed herein. Those in the art, having the benefit of this disclosure, will appreciate that some parts of the control system 200 might be located elsewhere. For example, it might be located on the towing vessel and signals transmitted back and forth over an umbilical in alternative embodiments.

Those in the art, having the benefit of this disclosure, will also appreciate that the aspect of the presently disclosed trajectory control technique described above is computer-implemented. FIG. 2 conceptually depicts selected portions of the hardware and software architecture of the control system 200 that are pertinent to the implementation of the control technique disclosed herein. The disclosed trajectory control technique admits wide latitude in the implementation of these portions and the control system 200 may include software and hardware not disclosed herein.

For example, the master controller 205 may be any suitable electronic processor or electronic processor set known to the art. Those in the art will appreciate that some types of electronic processors will be preferred in various embodiments depending on familiar implementation-specific details. Factors such as processing power, speed, cost, and power consumption, are commonly encountered in the design process and will be highly implementation specific. Because of their ubiquity in the art, such factors will be easily reconciled by those skilled in the art having the benefit of this disclosure.

Those in the art, having the benefit of this disclosure, will therefore appreciate that the master controller 205 may theoretically be an electronic micro-controller, an electronic controller, an electronic microprocessor, an electronic processor set, or an appropriately programmed application specific integrated circuit ("ASIC") or a field programmable gate array ("FPGA"). Some embodiments may even use some combination of these processor types.

The storage 222 may include a hard disk and/or random access memory ("RAM") and/or removable storage. The storage 222 is encoded with a number of software components, including the programs 260, 265 and the application 270. It may also be encoded with other software not shown. For example, it may include test software so that the marine seismic source 100 can be interrogated and its settings tested prior to or during deployment. Other kinds of software, such as an operating system, that are not shown may also reside on the storage 222.

Furthermore, there is no requirement that the functionality of the control system 200 described above be implemented as disclosed. For example, the application 265 may be implemented in some other kind of software component, such as a daemon or utility. The functionality of the application 270 need not be aggregated into a single component and may be distributed across two or more components.

Note that some portions of the detailed descriptions herein are presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the execution of the software's functionality transforms the computing apparatus on which it is performed. For example, acquisition of data will physically alter the content of the storage, as will subsequent processing of that data. The physical alteration is a "physical transformation" in that it changes the physical state of the storage for the computing apparatus.

Note also that the software implemented aspects of the invention are typically encoded on some form of program storage medium or, alternatively, implemented over some type of transmission medium. The program storage medium may be magnetic (e.g., a floppy disk or a hard drive) or optical (e.g., a compact disc read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The trajectory control technique described above is practiced during acquisition in a marine seismic survey to control the amplitude and frequency of the seismic signals emitted by the marine seismic source. The design of the survey may be performed in accordance with conventional practice and will typically include one or more tow vessels towing one or more sources. For present purposes, one exemplary embodiment of a source with which the survey may be conducted is the marine seismic source of FIG. 1-FIG. 2. The survey may also include one or more ocean bottom cables such as are known in the art.

Figure 3:
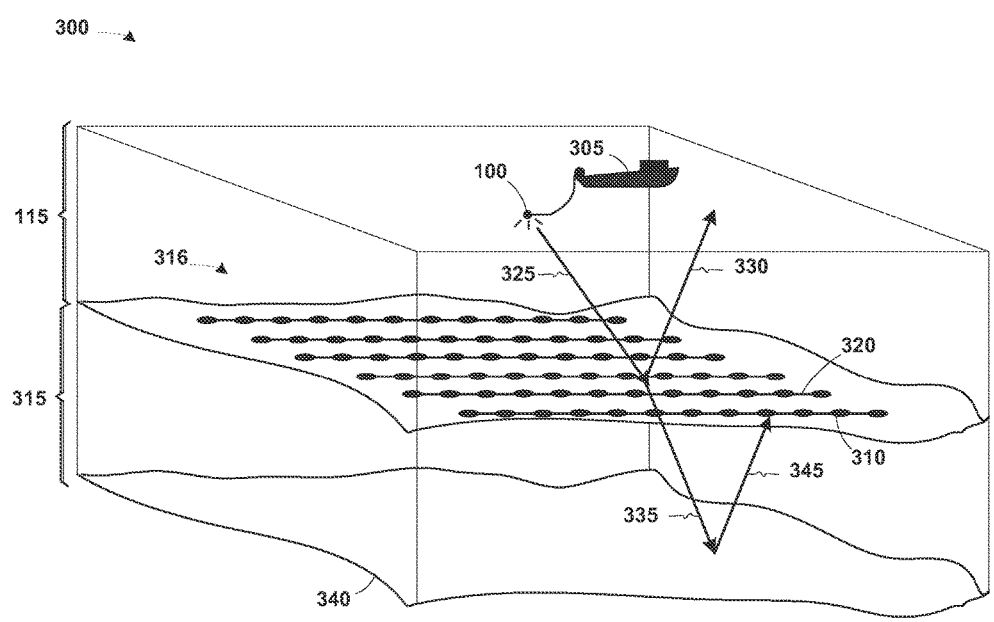
FIG. 3 conceptually depicts an exemplary marine seismic survey in which the marine seismic source of FIG. 1

Consider, for example, the marine seismic survey 300 in FIG. 3. The survey 300 includes a vessel 305 from which the marine seismic source 100 is deployed and towed. The marine seismic source 100 is towed through the water 115 as called for in the survey design at a depth dependent in part upon its frequency. A plurality of receivers 310 (only one indicated) are deployed from survey vessels (not shown). Some marine surveys tow arrays of receivers 310 mounted in streamers grouped into streamer arrays in a manner not shown. The illustrated embodiment, however, deploys the receivers to the seabed 316 as part of ocean bottom cables 320 (only one indicated).

Once the deployed marine seismic source 100 is warmed up, the tow vessel 305 tows it along the sail lines called for by the design. While the marine seismic source 100 is towed, it emits seismic acoustic signals represented by the ray 325. In the illustrated embodiment, these may be either swept or humming seismic signals as called for by the survey design. The acoustic signals propagate through the water 115 until they encounter the seabed 316. A portion of the signal reflects back from the seabed 316 to the sea surface, as represented by the ray 330, and a portion continues propagating through the subsurface 315 as indicated by the ray 335. Periodically, the acoustic signal will encounter reflectors, such as the reflector 340, and a portion will reflect back to the receivers 310 as indicated by the ray 345 and a portion will continue on until the energy in the signal dissipates beyond what the receivers 310 can detect. A portion of the acoustic signal may also return to the seabed or sea surface by other mechanisms than reflection, such as by refraction or by turning (a so-called "diving wave").

It is during the generation and emanation of the seismic acoustic signals that the presently disclosed trajectory-control technique operates. The frequency stabilization and trajectory control loops will now be described in more detail.

Figure 4:
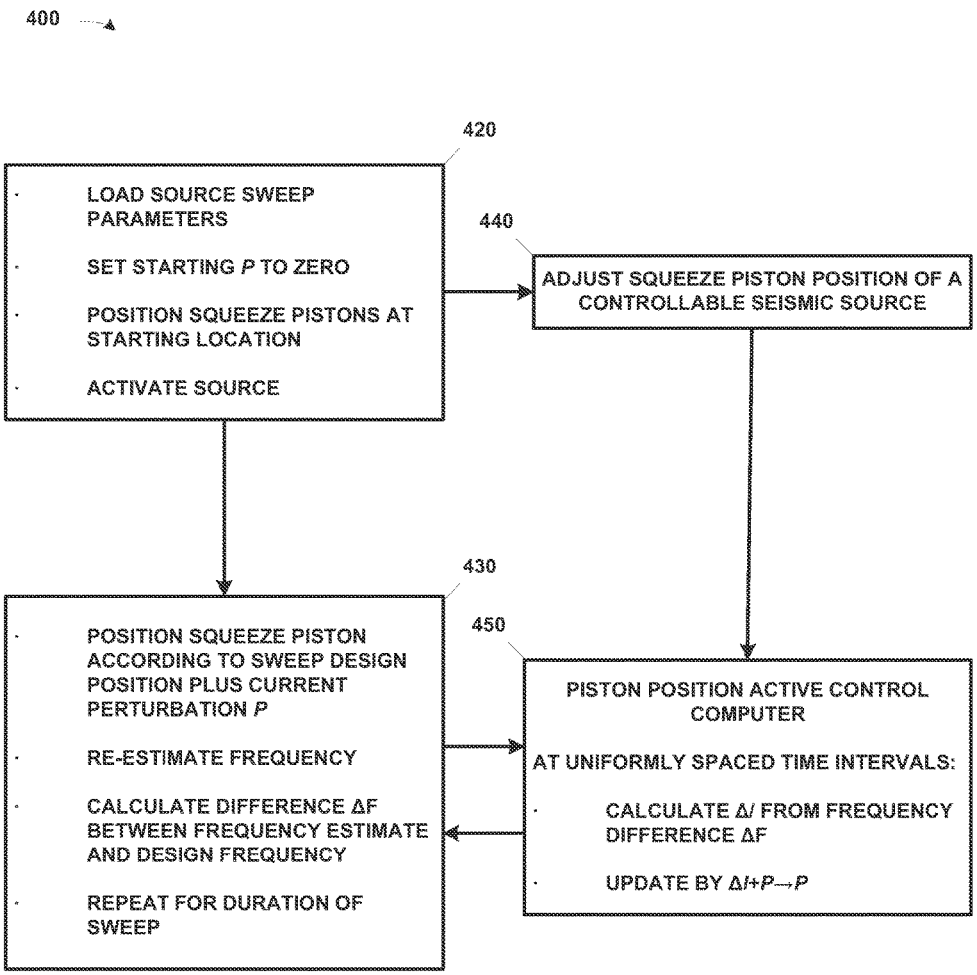
FIG. 4 illustrates how the source of FIG. 1 is controlled by the control system of FIG. 2 to stabilize the frequency of the source during acquisition.

Turning now to FIG. 4, a flow chart 400 illustrates how the source of FIG. 1 is controlled by the control system of FIG. 2 to stabilize the frequency of the source during acquisition. In the flow chart 400, the nominal sweep design parameters are used both to initialize the source 420 and as adjustable user parameters in the frequency stabilization (at 440). These parameters are determined during the survey design mentioned above and may be arrived at in conventional fashion. The frequency stabilization (at 440) may be implemented by, for example, the application 270 resident on local or remote hard disk or within some other sort of storage device—e.g., the storage 222 shown in FIG. 2—and executed by the master controller 205. The master controller 205 would monitor (at 450) the operating seismic source 100, calculate the necessary perturbation (at 500), and update the internal configuration of the marine seismic source 100 (at 430) as desired to adjust the emitted frequency back to nominal.

Referring again to FIG. 1, in operation, the radiating piston 105 moves with displacement x against the pressure $P_{ext}$ of the external seawater 115. The device is shown at equilibrium, x=0, so that the pressure inside the device is also $P_{ext}$. The radiating piston 105 is attached to a shaft 125 that passes through a variable gas spring 165 comprising two gas volumes 110a, 110b, confined by a squeeze piston, 132. The variable gas spring 165 is the two gas spring volumes 110a, 110b as defined by the pistons 132, 130, and endcap 129 and their respective seals. Fixed to the shaft 125 is a piston 130 that moves freely in the direction of the shaft axis 125, along with the shaft, within the gas spring 165. Seals (not shown) around the perimeter of the piston 130 prevent gas movement around the piston 130, creating two sealed compartments on either side, 110a, 110b. A squeeze piston 132 movable along the axis of shaft 125, similarly sealed around its perimeter, allows the length of the gas spring 110a, 110b, and thus its stiffness, to vary. The length of the gas spaces 110a, 110b, being equal to the total distance between the closest faces of the squeeze piston 132 and the end cap 129 minus the thickness of the secondary piston 130, is denoted "l". The pressure inside the sealed squeeze-piston compartments 110a, 110b at equilibrium is $P_S$.

As discussed above, the marine seismic source 100 tends to oscillate at a natural frequency determined by parameters such as the squeeze piston 132 position, the gas pressures within the spaces 110a, 110b and the interior of the casing 170 inside the device, the outside water pressure $P_{ext}$ (and hence the device operating depth), and to a lesser extent the seal frictions and the force and activation timing of the linear actuator 240 (shown in FIG. 2) feeding energy into the oscillations of the radiating piston. The squeeze piston 132 controls the resonant frequency of the source by simultaneously changing the equilibrium pressure $P_S$ inside the gas spring and its length.

To perform a given frequency sweep, the squeeze piston 132 is moved to change the oscillation period as required, but otherwise the device is (for the most part) allowed to oscillate at its natural frequency with an amplitude that may be controlled by use of the actuator 120a, 120b, as already described. Typically, the required squeeze-piston 132 trajectory will be calculated before the sweep begins. The default squeeze-piston control law, the heretofore mentioned active stiffening, acts to keep the piston 132 on its pre-calculated trajectory despite the perturbing forces introduced by the device's operation. Another control law separately governs the excitation actuator 120a, 120b so that it feeds energy into, or draws energy out of, the oscillations as required.

So, for example, following the default control law the squeeze piston 132 might be positioned so as to theoretically generate an oscillation at 2.0 Hz, but an oscillation at 2.05 Hz is produced instead because the theory behind the control law is only an approximation, or the conditions including the aforementioned gas pressures do not exactly match the assumptions in the control law's calculation. It is this sort of error that this frequency stabilization loop (430, 450) is designed to minimize.

More particularly, it uses active feedback to the squeeze piston 132 to keep the device much more nearly on frequency, on average, so that the natural frequency of the device more closely matches the desired frequency. The feedback loop is used to adjust a controllable parameter to minimize the discrepancy between the desired frequency and the natural frequency. In the illustrated embodiment, this is performed by adjusting the position of the squeeze piston 132.

The controllable parameter in this embodiment is a perturbation P that can be applied to the pre-calculated default squeeze piston position (DSPP). The natural frequency (f) of the source depends on the gas spring length (l) and we shall indicate this by writing f(l). Note that the natural frequency also depends on many other factors, including the pressure of the gas in the spaces 110a, 110b in FIG. 1 and the pressure $P_{ext}$ of the external fluid, but these dependencies are omitted for brevity's sake. Suppose now that a discrepancy $\Delta f = f_i(l) - f_e(l)$ occurs between the intended natural frequency, which we shall denote $f_i(l)$, and the estimated frequency $f_e(l)$. This could occur for example as a result of a temperature change in the gas in the spaces 110a, 110b. We wish to correct $f_e(l)$ to bring it close to $f_i(l)$ by changing the gas spring length l=DSPP+P. This may be achieved by the following simple iterative scheme. From knowledge of the dynamics of the system we calculate the rate of change: $f_e'(l) = \partial f_e(l)/\partial l$. To correct the discrepancy we now correct the perturbation P to the default squeeze piston position DSPP by an amount $\Delta l$ to a new value P' as follows:

$$\Delta l = \alpha \Delta f / f_e'(l)$$

$$P' = P + \Delta l$$

Here $\alpha$ is a stabilization factor value between 0 and 1, set by the user according to principles well-known to those versed in the art of control system design.

The quantity $f_e'(l)$ may be calculated as follows for a device as in FIG. 1. In this example it will be assumed that the gas within the spring behaves adiabatically over the timescale of a period of the resonance, that is to say that a quarter-period of the gas spring piston oscillations is too short for significant transfer of heat energy between the metal structure and the gas to occur. The small-displacement stiffness of the gas spring can then be determined as can the change in length required to counteract a change in estimated natural frequency.

In this example, to displace the gas spring piston by a distance x from the equilibrium position x=0, the gas spring piston would have to apply a force given by the equation:

$$F = p_s A_s \left( \left( \frac{\frac{l}{2}}{\frac{l}{2} + x} \right)^\gamma - \left( \frac{\frac{l}{2}}{\frac{l}{2} - x} \right)^\gamma \right)$$

where,
x is the displacement of the gas spring piston from the central position,
$p_s$ is the gas pressure inside the variable gas spring when the piston is at rest,
$A_s$ is the gas spring piston area,
l is the total length of the gas spring gas space (i.e. sum of the lengths on both sides of its piston), and,
$\gamma$ is the adiabatic index (ratio of principal specific heats) of the gas.

Differentiation with respect to x and then evaluating the result at x=0 provides an expression for the spring stiffness for small displacements:

$$k = -\frac{dF}{dx}\bigg|_{x=0} = \frac{4\gamma p_s A_s}{l}$$

When determining the change in stiffness with length (i.e. squeeze piston position), in this embodiment allowance should be made for the change in gas pressure that this produces. In doing this it will be useful to make a further assumption, that on the time scales over which the gas spring length changes the gas is able to equilibrate thermodynamically with the metal and so the partial derivative $$\left( \frac{\partial p_s}{\partial l} \right)$$

behaves in accordance with Boyle's Law:

$$\frac{dk}{dl} = \frac{\partial k}{\partial l} + \frac{\partial k}{\partial p_s} \frac{\partial p_s}{\partial l} = \frac{-4\gamma p_s A_s}{l^2} - \frac{4\gamma A_s}{l} \frac{p_s}{l} = -2\frac{k}{l}$$

To use the previous expression to model a control system, according to this embodiment a model of how gas spring stiffness affects the natural frequency is also needed. This model could be obtained as follows: The natural frequency of the system as a whole depends on the moving mass (the radiating piston and everything attached to it including the shaft and gas spring piston), the stationary mass (the casing and everything attached to it), and the gas spring stiffness. It also depends on the stiffness of the gas in the casing, which contains a third sealed gas-filled compartment. We can model this system as a simple harmonic oscillator consisting of two parallel springs in between two masses.

The well-known formula for the resonant angular frequency of an oscillating system containing two parallel springs between two masses is $$\omega = \sqrt{(k+k_V)\left(\frac{1}{m_1} + \frac{1}{m_2}\right)}$$

Here,
$k_V$ is the stiffness $$\frac{dF_V}{dx}$$

of the gas within the casing, where $F_V$ is the force exerted on the piston 105 by the gas within the casing 170;
$m_1$ is the total mass of the piston 105, the shaft 125 to which it is attached, and anything else attached to the shaft such as the piston 130, and the added mass of water that moves with the piston 105;
$m_2$ is the mass of the remainder of the source including the casing 170 and everything rigidly attached to it.

The effect of changing the gas spring lengths can be calculated as follows:

$$\frac{d\omega}{dl} = \frac{d\omega}{dk}\frac{dk}{dl} = \frac{-1}{2}\frac{\omega}{(k+k_V)}2\frac{k}{l} = \frac{-\omega}{\left(1+\frac{k_V}{k}\right)l}$$

In terms of frequency (f) rather than angular frequency ω:

$$\frac{df}{dl} = \frac{-f}{\left(1+\frac{k_V}{k}\right)l}$$

The quantity $f_e'(l)$ in the foregoing equations may be treated as identical to this.

To include $k_V$ in the model, it will be convenient to again assume in this example that the gas behaves adiabatically on the time scale of a quarter-period, so that an analogous expression to that for the gas spring stiffness can be used:

$$k_V = \frac{\gamma p_{ext} A}{L} = \frac{\gamma p_{ext} A^2}{V}$$

where L is an "equivalent length" of the casing gas space, equal to its volume V divided by the piston area A. The factor 4 has disappeared because there is only a single gas space.

Figure 5:
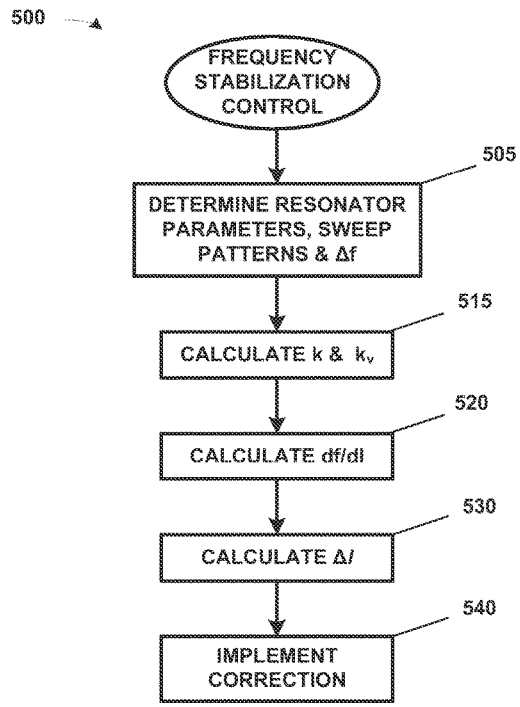
FIG. 5 illustrates an example operating logic for a portion of the frequency stabilization.

FIG. 5 contains an illustration of how the preceding equations might be used in one particular embodiment. In this embodiment, the resonator parameters discussed above will be determined (at 505) along with the sweep pattern and Δf. Some of these parameters might be characteristic of the type of resonator utilized and others might need to be determined separately for each resonator. Further, in some cases parameters that are calculable from those identified above might be determined, (i.e., a set of parameters should be determined for the resonator from which those identified above can be calculated).

In this particular embodiment, some of the parameters, including k, $k_V$, and df/dl, identified herein, are calculated (at 515, 520). Some of these quantities may need to be computed only once per survey. Others may need to be redetermined each shot. For example, if the temperature of the device changes with time, or may need to be continuously recalculated during each sweep as the squeeze pistons move, then the various internal pressures and stiffness values will thereby change. Thus, even though FIGS. 4 and 5 might seem to indicate that the calculation of these parameters (at 515, 520) are outside of the feedback loop (at 430, 450), it should be understood that in some cases, several of these quantities might be repeatedly recalculated as the situation merits. An estimated correction is calculated (at 530) and is then implemented (at 540).

In this example, the default (unperturbed) control law will be used (at 420) to determine the initial position of the squeeze piston. This positioning might be adjusted depending on the selected survey type (e.g., single frequency, narrow band sweep, etc.) and particular frequencies involved.

A sweep, according to the designed sweep pattern, is conducted (at 430). During that sweep, in an embodiment, the actual performance of the resonator will be measured and compared with the desired sweep. According to the instant technique, this will be done by estimating its natural frequency. In the case where a hum is called for, the natural frequency estimate will provide a measure of the accuracy of the sweep and the deviation therefrom. If the resonator is sweeping over a range of frequencies, it will still be possible to determine a deviation from the desired sweep frequencies since, in a sweep over a range, an expected frequency at each time point will be known and can be compared with the estimated natural frequency for that time interval. There are many alternative techniques of system state estimation to establish the frequency deviation of the gas spring piston from the desired frequency. Those of ordinary skill in the art will readily be able to devise the same.

Any such method must be cognizant of the effect of the trajectory control loop 650 on the actual frequency of the device. The frequency deviation to be estimated is the difference of the resonance frequency of the device in the absence of trajectory control (its "natural frequency") and the desired frequency. If the natural frequency estimation method is based on the observed frequency of the device it must estimate and allow for the effect of the trajectory control loop 650. Alternatively it may estimate the natural frequency from the disposition of the squeeze piston 132, the gas spring piston 130, and the gas pressures in the spaces 110a, 110b and within the casing 170.

Finally, given some measure of the frequency deviation, an adjustment can be determined (at 450) using the equations set out above (at 515-530) and the sweep continued.

As an example, consider some conditions that might be typical of a device; such as, the marine seismic source 100 in FIG. 1, set to perform a 4 Hz hum at an operating depth of 30 meters. In this particular case, the diameter of the radiating piston will be taken to be 1.38 meters, the area of the squeeze piston 0.25 m², and the interior volume of the device 8 cubic meters. Using the equations set out above, the stiffness may be calculated as follows:

l=0.66 m (the value appropriate for a 4 Hz resonance);
p=400 000 Pa (ambient pressure at ~30 m water depth);
$A_S$=0.25 m²;
A=π(1.38 m/2)²=1.50 m²;
V=8 m³, and,
γ=1.4 (the adiabatic index of a diatomic gas like nitrogen).
The foregoing implies that:
k=8.48 10⁵ Nm⁻¹
$k_f$=1.58 10⁵ Nm⁻¹
or, $$\frac{df}{dl} = -5.11 \frac{Hz}{m}$$

Note that the previous equation may be thought of as, in some sense, translating a frequency error into a position error, which position error can then be adjusted according to the teachings set out herein.

For purposes of this example, this implies that in order to correct a 5% drift in frequency (not atypical in these sorts of tests), the squeeze piston 132 would have to move about (0.05)(4 Hz)/(5.11 Hz/m)=0.0392 meters, or about 40 mm. This perturbation should not be overly demanding for many systems of interest.

The frequency stabilization feedback loop discussed immediately above controls the natural resonance of the system to keep it close to the desired frequency. The presently disclosed trajectory control technique includes an additional feedback control loop that controls the fine detail of the trajectory, while the frequency feedback control loop, described above, maintains the natural frequency of the marine seismic at the right frequency, or nearly the right frequency. The implementation of this second control loop will now be discussed with respect to the marine seismic source 100 of FIG. 1.

In this case the trajectory of the trajectory control refers to the relative displacement of radiating piston 105 and casing 170 ("relative trajectory"). The frequency control mechanism consists of altering the positions of the squeeze piston 132 at the end of the gas spring 165; and the exciter force is applied via the excitation actuator 240. The marine seismic source 100 will typically be used in a cyclical manner, its desired trajectory repeating exactly with a fixed or nearly fixed time period between repetitions. In this case, the first control loop described above may detect the frequency error during one cycle and apply the correction via the frequency control mechanism in the following cycle. However, the second control loop will operate in real time (i.e., immediately).

The control mechanism in this case is the control system 200 shown in FIG. 2. Note that this is, by way of example and illustration, one means by which the operation of the marine seismic source 100 may be controlled. As discussed above, the trajectory control method is implemented in this embodiment in the application 270 and comprises two sets of two feedback loops.

Figure 6A:
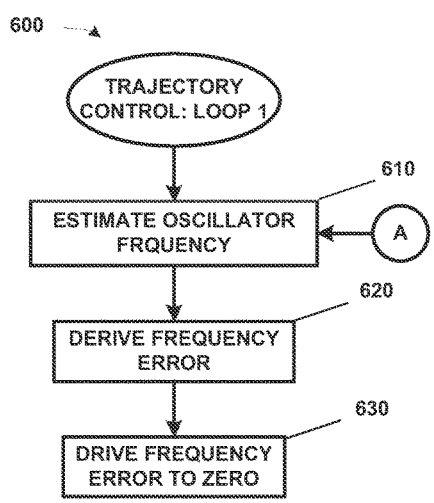
FIG. 6A and FIG. 6B illustrate the trajectory control method of the instant disclosure.

Referring now to FIG. 6A, the first loop 600 estimates (at 610) the source's natural frequency. It then derives (at 620) a frequency error as the difference between the estimated frequency and the frequency of the desired trajectory. It then utilizes (at 630) the frequency control mechanism to attempt to drive the error signal to zero in the manner well known to those versed in the art of control engineering.

Figure 6B:
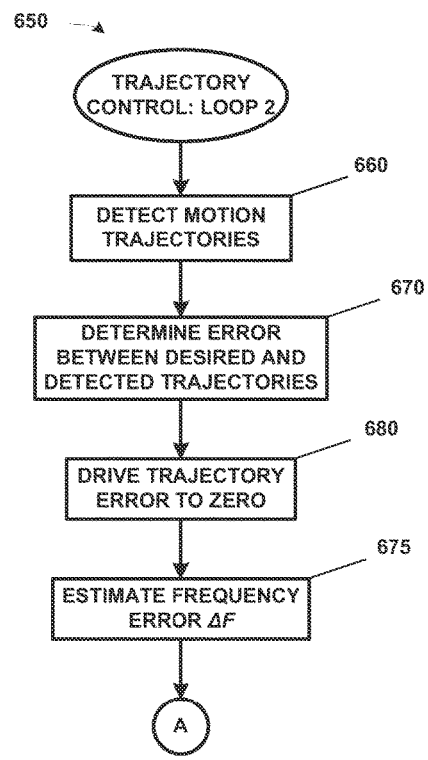

Turning to FIG. 6B, the second feedback loop 650 detects (at 660) the motion trajectory of the oscillator. It then derives (at 670) an error signal from the difference between the desired and detected trajectories. A control force is then applied (at 680) via the exciter that attempts to drive the error signal to zero in the manner well known to those versed in the art of control engineering. One way to drive the error signal to zero is to measure the error in motion between the desired and detected motions of the oscillator. A control force is then applied that is linearly proportional to the error. Alternatively, "bang-bang" control may be used: applying a constant-magnitude force in the direction opposing the error. Other embodiments for control may be considered by one of ordinary skill in the art.

First loop 600 closely follows the method disclosed in U.S. Application Ser. No. 61/894,729, filed Oct. 23, 2013 and U.S. application Ser. No. 14/515,223 filed Oct. 15, 2014, entitled "System and Method for Resonator Frequency Control by Active Squeeze Position Feedback". However, one difference is that the second loop 650 will act to keep the oscillation at the desired frequency regardless of the source's natural frequency. Thus, if the second loop is operating, the natural frequency cannot be estimated by directly measuring the period of the oscillations, which is typically the most straightforward means for estimation.

One estimation method would be to briefly turn off the second loop, directly measure the source's natural frequency, use this estimate in box 610, and then reinstate the second loop. Alternatively, the source's natural frequency may be estimated from measurements of its internal state and the state of the environment. For example, the source's natural frequency may be tabulated for a variety of pressures, temperatures, operating depths, etc., and based on real-time measurements the appropriate tabulated value used as the estimate in box 610. In an embodiment, the frequency error may be estimated indirectly, from the history of trajectory errors (box 675).

To further an understanding of how the two feedback control loops 600, 650 may be implemented with respect to the marine seismic source 100 of FIG. 1-FIG. 2, an analytical numerical example will now be provided. This example will demonstrate in particular that the forces required to correct the trajectory (at box 680) are strongly dependent on the source's natural oscillation frequency (what is estimated at box 610).

Figure 7:
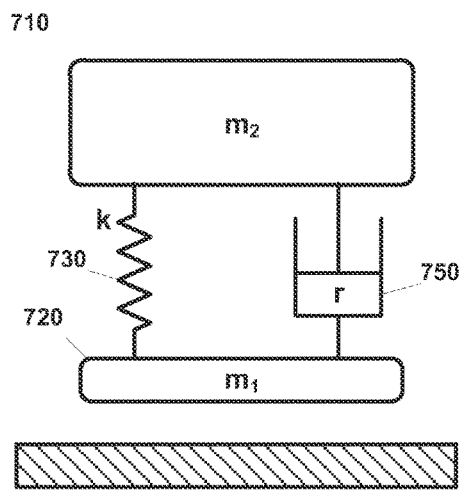
FIG. 7 illustrates an equivalent circuit of a single-degree-of-freedom mechanical resonator representative of a low frequency resonant marine seismic source.

Consider the source as a simple, one degree-of-freedom oscillator, as illustrated in the equivalent circuit of FIG. 7. The piston mass $m_1$ is represented by 720, the remaining source mass $m_2$ by 710. The variable spring constant is k N/m (730), the viscous resistance is r N/(ms⁻¹) (750), and the two masses are excited to relative motion at angular frequency ω rad/s with peak velocity v m/s by a force of amplitude F, measured in Newtons.

In the present context, F is the excitation force applied to the source; ω is the angular frequency at which it is desired that the source piston should oscillate; the peak velocity with which it is desired that it should oscillate is denoted by v.

As is known to one skilled in the art of dynamics, the following relation between force F, frequency ω and the properties of the oscillator, expressed in the frequency domain in complex notation, holds good:

$$F = v\left(r + i\omega m - i\frac{k}{\omega}\right)$$

Here m is the harmonic mean of the masses $m_1$ and $m_2$.

This can be re-written in terms of the natural frequency $\omega_0$ of the oscillator:

$$\omega_0 = \sqrt{\frac{k}{m}}$$

$$F = v\left(r + im\frac{\omega^2 - \omega_0^2}{\omega}\right)$$

$$|F| = v\sqrt{r^2 + m^2\frac{(\omega^2 - \omega_0^2)^2}{\omega^2}}$$

From inspection of this equation it is evident that when forced at the natural frequency, $\omega_0$, an excitation force f=vr will produce a velocity v, and that at any other frequency the force required to produce the same velocity v will be higher. The force increases as the frequency difference $\omega^2-\omega_0^2$ increases. Thus, if it is desired to produce a certain velocity v and the force available is limited to $F_{max}$, then the natural frequency $\omega_0$ must be kept close to the desired frequency $\omega$. It is also evident from this equation that the maximum difference between desired frequency and natural frequency at which the available excitation force will still be sufficient to produce the desired velocity v depends on $F_{max}$ and decreases with increasing m and r.

Figure 8:
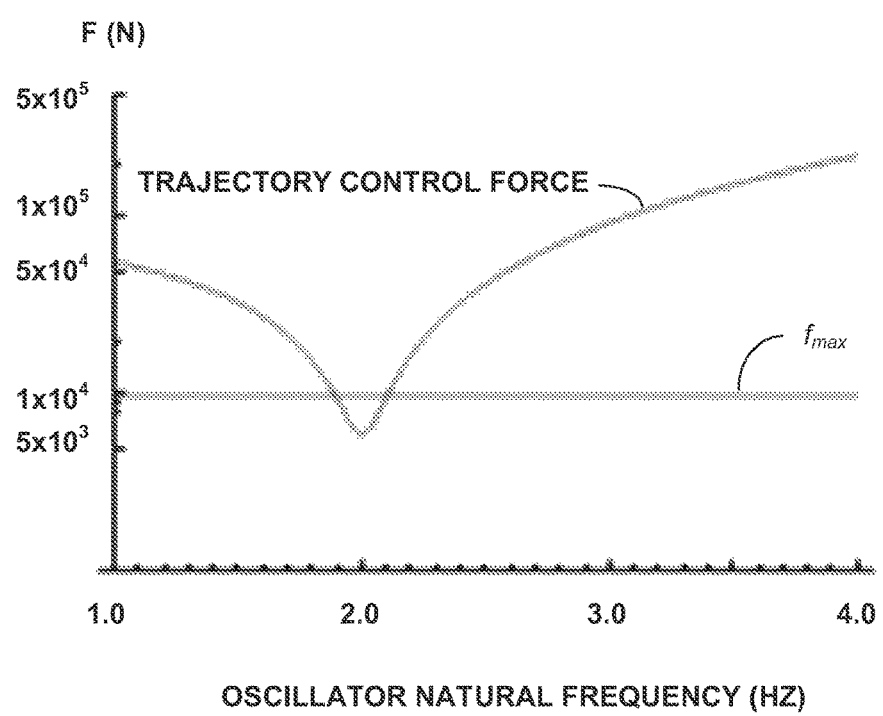
FIG. 8 is a graph of the force required to control the trajectory of a resonant source.

Suppose, by way of illustration, that a source has the following characteristics:

r=3000. N/m/s;
v=2. m/s;
m=3000. kg; here this represents the effective moving mass, typically the harmonic mean of the masses of piston and casing;
desired frequency=2 Hz;
$F_{max}$=10,000 N;

A graph of the force that would be required for trajectory control, as a function of the tuned natural frequency of the source, is shown in FIG. 8. Also shown is a horizontal line indicating $F_{max}$.

It is evident that the force required increases very rapidly with frequency error. In this example the oscillator natural frequency range must be maintained within the range 1.9 Hz to 2.1 Hz for trajectory control to be effective in controlling the trajectory to be an oscillation at 2 Hz with a peak velocity of 2 m/s. That is, the trajectory control will not tolerate a frequency deviation of greater than 0.1 Hz, or 5% of the desired frequency.

It will be evident to those skilled in the art that the required forces are strongly dependent on the frequency error Δf, and thus the history of correcting forces applied at 680 can be used at 675 to estimate the oscillator's natural frequency at 610. In one embodiment, the correcting forces are applied as follows: Let "fxd" be the control force applied at 680 multiplied by the offset of the moving assembly 105, 125, 130, 120b from its position averaged over an oscillation cycle. Then, for a simple harmonic oscillator system and a small frequency error, to good approximation, "fxd" averaged over an oscillation cycle will be directly proportional to the frequency error 620.

This can be seen as follows: Force versus offset for a simple harmonic oscillator system follow's Hooke's law, F=k x, where 'F' is the force applied by the spring, 'k' is the spring constant of the spring, and 'x' is the displacement from the spring's natural length. If the moving mass obeys this equation despite an error in the spring constant k, which instead of the nominal value k has the value $k_{actual}$, then the applied trajectory control force $F_{control}$ must be exactly making up for the error: F=k x=$F_{control}$+$k_{actual}$ x, and thus $F_{control}$=(k-$k_{actual}$) x. Multiplying the control force by the displacement x, we have fxd=$F_{control}$ x=(k-$k_{actual}$) $x^2$. Averaged over an oscillation cycle, $x^2$ averages to half its peak value, and thus $F_{control}$ x averaged over an oscillation cycle is proportional to k-$k_{actual}$.

This allows the difference of the squares of desired frequency $\omega_{des}$ and natural frequency $\omega_{nat}$ to be estimated as follows:

$$\omega_{des}^2 = \omega_{nat}^2 = \frac{k - k_{actual}}{m}$$

$$= \frac{\overline{F_{control} x}}{m\overline{x^2}}$$

Here a superscript bar indicates average over a period of oscillation.

The natural frequency can then be estimated straightforwardly and the control loop 600 can be operated by applying this calculation at step 610.

These calculations are only exact for a linear oscillator, whereas the system of FIG. 1 constitutes a non-linear oscillator with a super-linear spring. The result above will apply with increasing precision, the smaller the oscillations, since in the limit of infinitesimal motions the system behaves linearly. For finite oscillations the above equations will supply only approximate results. However, the graph of FIG. 8 indicates that trajectory control will be successful for finite errors in frequency difference so that some degree of error in estimating and correcting the natural frequency can be tolerated.

Figure 9:
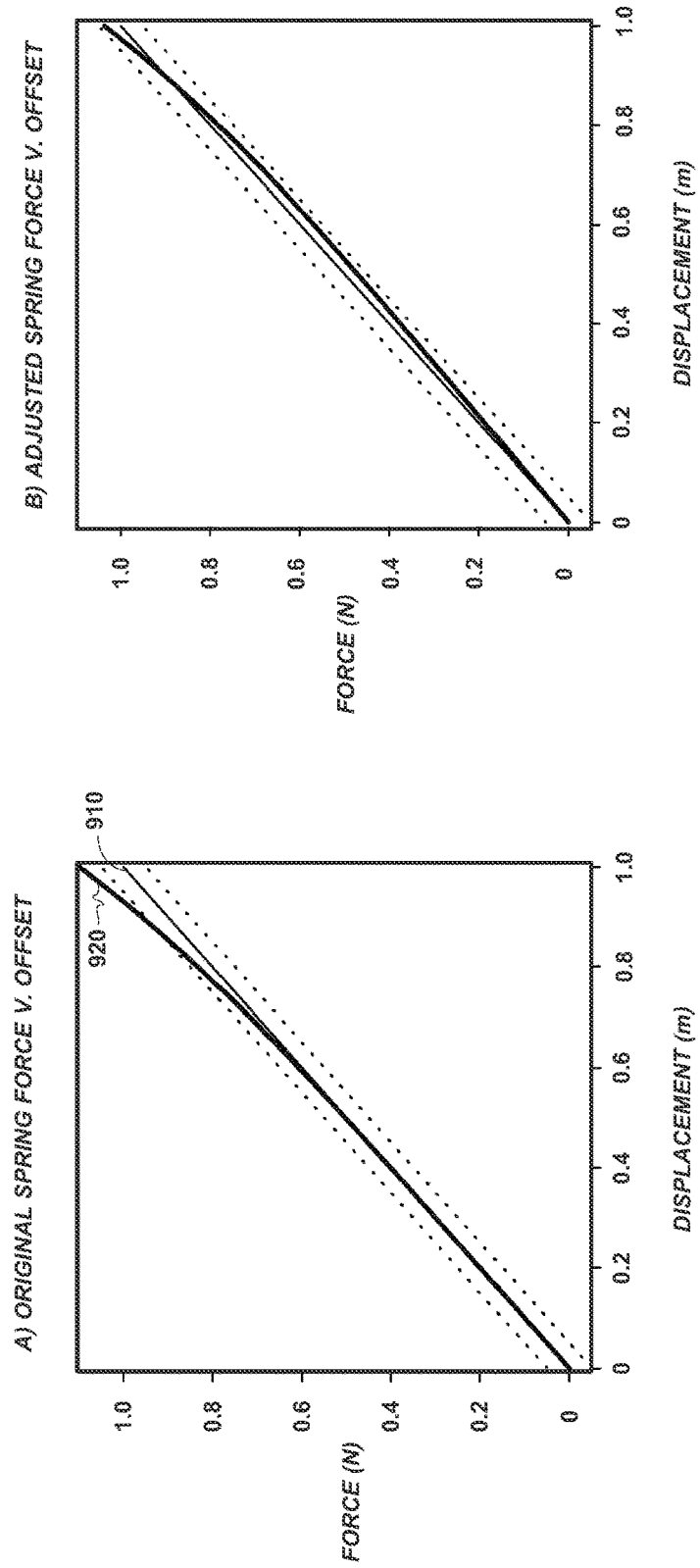
FIG. 9 shows force versus displacement graphs for a simple harmonic oscillator before and after frequency stabilization.
Figure 10:
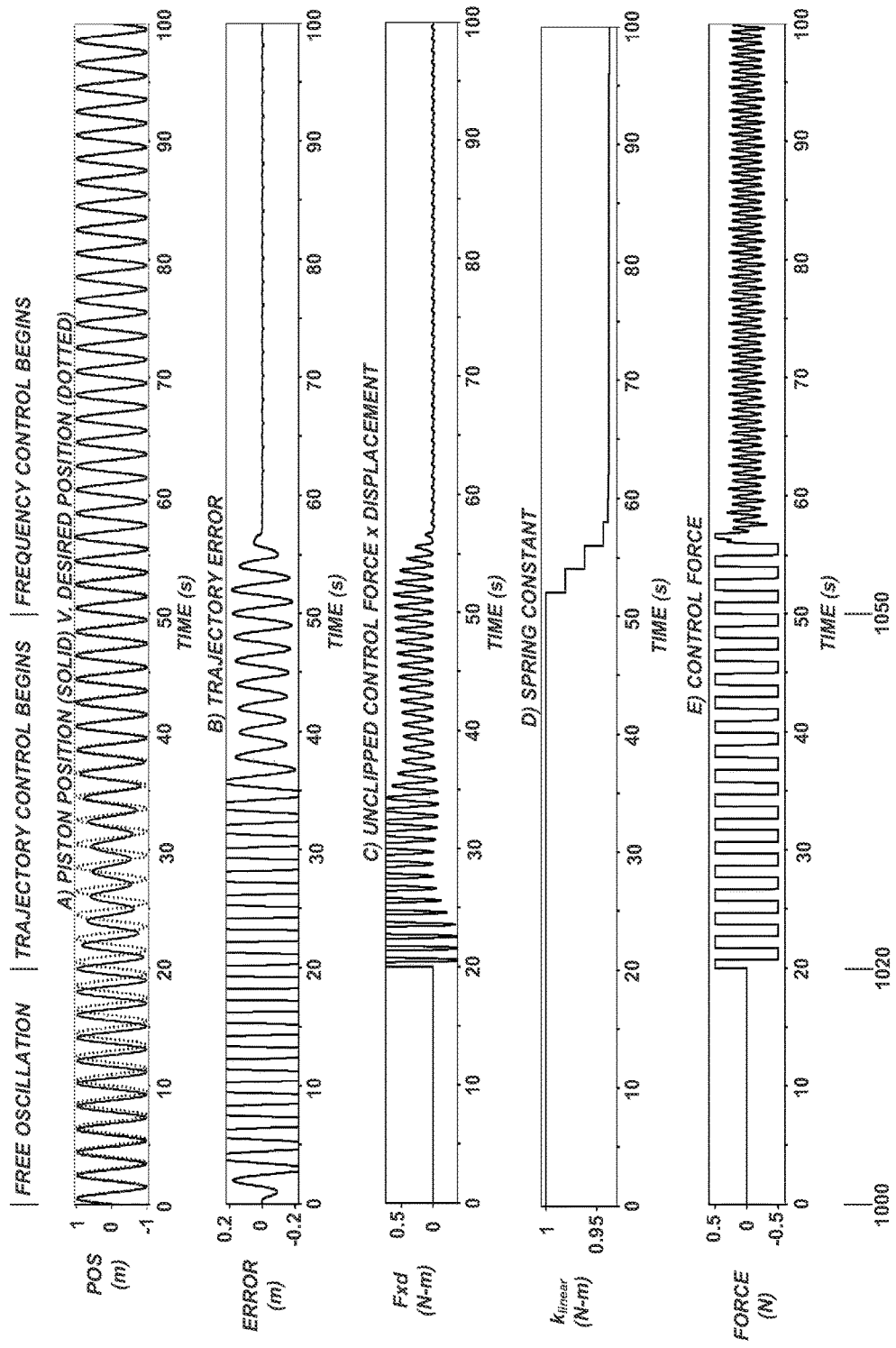
FIG. 10 demonstrates the operation of the trajectory control method and frequency stabilization method for the simple harmonic oscillator of FIG. 9.

Other embodiments allowing the control force 680 to be used to estimate the natural frequency 610 and the frequency error 620 will be evident to those skilled in the arts. FIGS. 9 and 10 demonstrate a computational numerical example of these interacting control loops in practice. FIG. 9A shows force versus displacement for an ideal, linear spring with spring constant k=1 (910), and for a somewhat nonlinear spring that becomes stiffer at larger displacements: k=(1+$displacement^4$)/10 (920). We construct a harmonic oscillator using both these springs, with the mass and starting velocity chosen so that for the linear spring the oscillation period is 2 seconds and the peak displacement is 1 meter. Our goal is to use trajectory control to make the nonlinear spring act like the linear spring.

FIG. 10A from 0 seconds (at 1000) to 20 seconds (at 1020) shows how the linear and nonlinear oscillators differ under free oscillation. The dotted line shows the motion for the linear spring, the solid line, the motion for the nonlinear spring. The primary effect of the increased stiffness of the nonlinear spring at larger displacements is to slightly decrease the oscillation period. After 20 seconds of free oscillation, a significant phase error has accumulated. FIG. 10B shows the trajectory error, the difference between these two cases.

At 20 seconds (1020) trajectory control loop 2 (650) begins. The applied control force (shown in FIG. 10E) is linearly proportional to the velocity error, but is limited in magnitude to 5% of the peak force of the linear spring. The trajectory error (FIG. 10B) reduces as the control force brings the phase of the oscillation back into alignment with the desired trajectory, but the error does not go to zero. It cannot, because the force required to completely correct for the nonlinearity in the spring is too large (it lies outside the bounds of the dotted lines in FIG. 9A, which show the maximum force deviation that could be corrected back to the ideal case 910).

At 50 seconds (1050) control loop 1 (600), frequency control, begins. It is allowed to adjust the overall stiffness of the spring, but not to correct the nonlinearity in the spring: $k=(k_{linear}+\text{displacement}^4)/10$, with $k_{linear}$ the adjustable parameter. FIG. 10C shows "fxd", which represents the calculated control force (before being clipped at 5%) times the displacement. The rate of change of the linear portion of the spring constant $k_{linear}$ is proportional to fxd averaged over two-second intervals (but with a maximum rate of change enforced). The perturbation to the linear portion of the spring constant is applied at the end of each averaging interval (as in box 450). FIG. 10D shows how the linear portion of the spring constant rapidly adjusts to bring the natural period to the required 2 seconds. The adjusted spring is still nonlinear, as shown in FIG. 9B, with $k=0.937+\text{displacement}^4/10$, but after adjustment, the required forces are now small enough that the control force is adequate to the task, and the trajectory error (FIG. 10B) is driven to nearly zero.

This simple computational model demonstrates how the combined control loops 600 and 650 can produce a nearly perfect sinusoidal motion out of an oscillator with a strongly nonlinear spring. Those skilled in the art of control theory will be able to conceive of many alternative embodiments to the simple examples given here; in particular the control laws may adaptively adjust ("learn"), anticipate corrections based on previous experience, or may include other sources of information such as measurements from the environment of the source (for example, based on temperature, pressure, or depth).

In the embodiment illustrated in FIG. 1, the marine seismic source 100 in FIG. 1-FIG. 2 is deployed for acquisition as in FIG. 3 or in similar fashion. During the acquisition, the operation of the marine seismic source 100 is controlled both by the frequency stabilization technique illustrated in FIG. 4-FIG. 5 and by the trajectory control of FIG. 6. More particularly, the frequency stabilization technique of FIG. 4-FIG. 5 works within trajectory control loop 1 (600) to control the marine seismic source 100 so that it resonates at the correct frequency, or very close to the correct frequency. Once it is resonating at the desired frequency, trajectory control loop 2 (650) makes small adjustments to the oscillatory motion on top of that.

That is, trajectory control loop 1 (frequency stabilization) effects large, or "gross", changes in frequency, whereas trajectory control loop 2 effects small, or "fine", changes in frequency or motion. A small change in frequency, for example, might be 0.1 Hz. Or, a minor modification to the motion might change the precise shape of the sweep—for example, to damp down unwanted higher-frequency harmonics, or perhaps to accentuate a particular harmonic. Therefore, trajectory control loop 2 makes small tweaks or adjustments continuously to the motion to keep it closer to a desired nominal trajectory.

Note the contrast with the operation and control of a land vibrator. A land vibrator is an example of a system that is not very resonant. The land vibrator brute-forces the output of the device by forcing the driving piston to move along a determined trajectory. That is, it forces the radiating piston to move to where it is supposed to be without regard to what its resonant frequency is. In the marine seismic source 100, however, the excitation actuator is not nearly powerful enough to brute-force the device to a particular frequency that differs significantly from its natural resonant frequency. It instead "finesses" the output that the device already "wants to make" (i.e., its natural resonant frequency).

Where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

The following patent applications and patents are hereby incorporated by reference for those portions that are listed and for the purposes set forth as if set forth verbatim herein:

U.S. application Ser. No. 12/995,763, entitled, "Marine Seismic Source", filed Jun. 17, 2009, in the name of the inventors Martin Thompson and Mark F. L. Harper, published Apr. 14, 2011, as U.S. Patent Publication 2011/0085422, and commonly assigned herewith for its teachings the structure and operation of an exemplary low frequency, swept marine seismic source located in FIG. 1 and at ¶¶[0026]-[0032], therein.

U.S. application Ser. No. 13/327,524, entitled, "Seismic Acquisition Using Narrowband Seismic Sources", filed Dec. 15, 2011, in the name of the inventors Joseph A. Dellinger et al., published Jun. 21, 2012, as U.S. Patent Publication 2012/0155217, and commonly assigned herewith for its teachings regarding data acquisition located at ¶¶[0024]-[0040], [0054]-[0059], [0065]-[0088].

U.S. Application Ser. No. 61/894,729, filed Oct. 23, 2013 and U.S. application Ser. No. 14/515,223 filed Oct. 15, 2014, entitled "System and Method for Resonator Frequency Control by Active Squeeze Position Feedback", filed Oct. 23, 2013.

To the extent that any patent, patent application or paper incorporated by reference herein conflicts with the present disclosure, the present disclosure controls.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for controlling trajectory in a resonant marine seismic source, comprising:
   controlling a source frequency of the resonant marine seismic source, including:
      estimating a source natural frequency of the resonant marine seismic source;
      deriving a frequency error as a difference between the estimated source natural frequency and a frequency of the desired trajectory of the resonant marine seismic source; and
      driving the frequency error to zero; and
   controlling a motion trajectory of a moving part of an oscillator of the resonant marine seismic source after controlling the source frequency of the resonant marine seismic source wherein the motion trajectory of the moving part of the oscillator, wherein controlling the motion trajectory of the moving part includes:
      detecting the motion trajectory of the moving part of the oscillator;

deriving a motion trajectory error as a difference between a desired motion trajectory of the moving part of the oscillator and the detected motion trajectory; and driving the motion trajectory error to zero.

2. The method of claim 1, wherein estimating the source natural frequency includes sensing a parameter associated with the source frequency.

3. The method of claim 2, wherein driving the frequency error to zero includes modifying a frequency control signal to the resonant marine seismic source.

4. The method of claim 1, wherein detecting the motion trajectory includes sensing a parameter of the motion trajectory.

5. The method of claim 4, wherein driving the motion trajectory error to zero includes:

modifying a signal determining the sensed parameter; and iterating the trajectory control.

6. The method of claim 1, wherein driving the motion trajectory error to zero includes:

modifying a signal determining the motion trajectory; and iterating the trajectory control.

7. The method of claim 1, further comprising performing frequency stabilization control.

* * * * *